Dec. 2, 1930.    J. O. HUXFORD    1,783,650
TURPENTINE APRON
Filed July 9, 1929
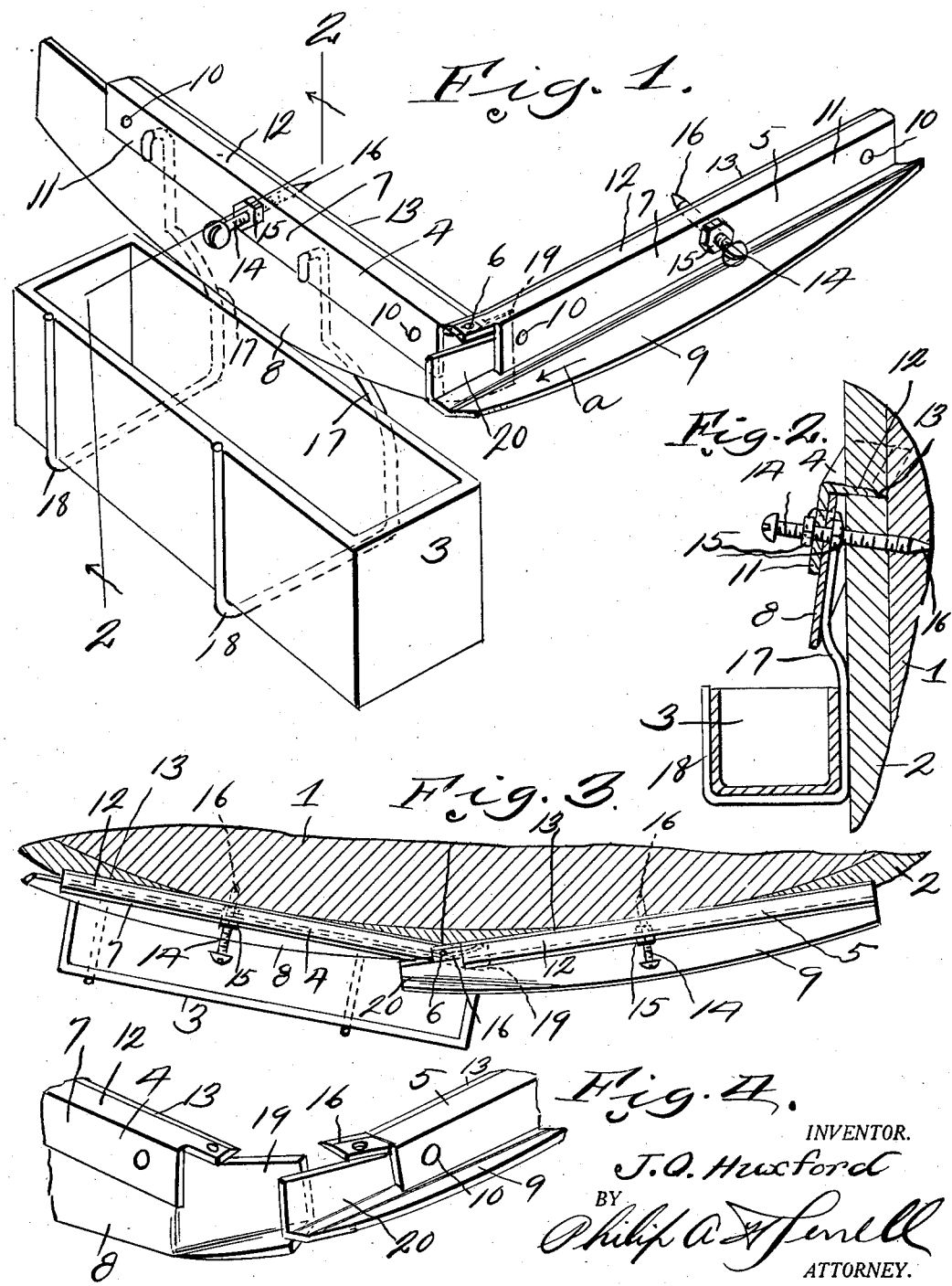
INVENTOR.
J. O. Huxford
BY
Philip A. Ferrell
ATTORNEY.

Patented Dec. 2, 1930

1,783,650

UNITED STATES PATENT OFFICE

JERE O. HUXFORD, OF PERRY, FLORIDA

TURPENTINE APRON

Application filed July 9, 1929. Serial No. 376,952.

The invention relates to aprons used in connection with pine trees, and has for its object to provide a device of this character which may be easily and quickly applied to a tree, and constructed in a manner whereby the turpentine will be caused to flow into a turpentine cup preferably supported by the device.

A further object is to provide an apron which may be easily and quickly applied to a tree without materially marring the tree as is the present practice and constructed from hingedly connected sections whereby the device may be attached to trees of various diameters.

A further object is to provide the upper edges of the hingedly connected sections with flanges terminating in sharpened edges adapted to be forced in the bark of a tree for forming a leak proof connection and said sections with piercing members adapted to be imbedded in the bark and wood of the tree for securely holding the apron in position.

A further object is to provide a turpentine apron comprising hingedly connected sections adapted to be angularly disposed in relation to each other, said sections being formed from rigid angle members having one of their flanges sharpened and their ends hingedly connected together, the other flanges extending downwardly and having ductile sheet metal members connected thereto and forming means for deflecting the sap into a cup supported by one of said sections. Also to provide piercing members extending through the downwardly extending flanges of the angle members and adapted to be imbedded in a tree.

A further object is to provide one of the sections with depending U-shaped brackets for receiving and supporting a sap cup.

A further object is to position the brackets whereby the deflecting members of the hinged sections will deflect the sap into the chamber of the cup.

A further object is to provide the adjacent hinged ends of the sections with pliable extensions which will deflect the sap into the cup and one of said extensions carried by the section which does not support the cup positioned whereby its discharge end will be disposed above the cup.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the apron and cup supported thereby.

Figure 2 is a vertical transverse sectional view through the apron and cup taken on line 2—2 of Figure 1.

Figure 3 is a horizontal sectional view through a portion of a tree, showing the apron applied thereto.

Figure 4 is a detail perspective view of the adjacent ends of the hinged sections showing the same in position to be assembled.

Referring to the drawing the numeral 1 designates a pine tree and 2 the bark thereof. At the present time when cups 3 are applied to a tree the tree is materially marred and often damaged and to obviate this difficulty the present device is primarily designed. The apron is formed from sections 4 and 5, which sections are hingedly connected together at 6 whereby the sections may be placed at various angular positions according to the curvature of the tree. Sections 4 and 5 comprise angle bars 7 and sheet metal members 8 and 9 secured by means of rivets 10 to the depending flanges 11 of the angular members 7. The flanges 12 of the angle members are provided with sharpened edges 13 adapted to be forced into the bark 2 of the tree as clearly shown in Figure 3, thereby reducing the damage to the tree and bark to a minimum. The adjacent ends of the flanges 12 extend beyond the ends of the bars and are overlapped as shown in Figure 1, thereby allowing hinged movement of the sections in relation to each other.

Extending through the flanges 11 are adjustable bolts 14 held in adjusted position by means of the nuts 15, and which bolts are provided with sharpened ends 16 adapted to pierce the tree 1 beneath the bark 2 for holding the apron in position. It will be noted that the overlapping ear 16 of the section 5 is angularly disposed, therefore it will be seen that when the device is in position on the tree, the sections will incline downwardly and inwardly toward the hinging point 6 whereby the sap will flow over the apron, and in the case of the section 4 over the sheet metal member 8 into the cup 3. In the case of the member 5 the sap will flow over said member onto the sheet metal trough member 9, and then will flow in the direction of the arrow a into the cup 3. This is made possible by the extension of the member 9 beyond the angular member 5 and between the spaced ends of the angle members 7 as clearly shown in Figure 1. By embedding the flanges 12 in the bark a leak proof connection is formed between the apron and the tree, therefore it will be seen that loss incident to leakage is obviated.

Extending downwardly from the inner side of the sheet metal member 8 are the arms 17 of the U-shaped cup supporting members 18, and it will be noted that the arms 17 are inwardly offset. Therefore when the apron is in position as clearly shown in Figure 2, the member 8 will incline downwardly and outwardly in relation to the tree, thereby positioning the member 8 where the sap will flow into the cup 3. At the connecting point between the sections the sheet metal member 8 is preferably provided with an angularly shaped extension 19, which is pliable, and which member 19 overlies the rear side of the end 20 of the member 9 for additionally forming deflecting means for the sap.

From the above it will be seen that a turpentine tree apron is provided which is simple in construction, may be easily and quickly applied to a tree without materially marring the tree and the device may be cheaply manufactured and sold. If desired, turpentine cups 3 of various shapes may be used and may be supported in any suitable manner for the reception of sap directed therein by the apron.

The invention having been set forth what is claimed as new and useful is:—

1. The combination with a tree, of a sap apron, said apron comprising hingedly connected sections, said sections having sharpened flanges embedded in the tree for substantially their full length, piercing members carried by the sections and adapted to be embedded in the tree beyond the depth of the bark of the tree, a sap cup carried by one of said sections and sap deflecting means carried by both of said sections and forming means whereby sap is deflected into said cup.

2. The combination with a tree, of a sap apron, said apron comprising hingedly connected sections, sharpened flanges carried by said sections and embedded in the tree, said sections inclining downwardly and inwardly towards their hinged points, tree piercing members carried by said sections and embedded in the tree, sap deflecting members carried by the sections and positioned to discharge sap adjacent one of the sections and a sap cup carried by said last named sections.

3. The combination with a sap apron comprising hingedly connected sections inclining downwardly and inwardly towards each other, means for attaching said sections to a tree, deflecting members carried by said hinged sections, the inner ends of said deflecting members being overlapped adjacent the hinging point, a sap cup beneath one of said sections, one of said deflecting member ends being trough shaped and disposed above one end of the cup, U-shaped supporting brackets carried by one of the sections and supporting the cup, said bracket being inwardly offset whereby when engaging a tree the apron sections will incline downwardly and outwardly.

In testimony whereof he hereunto affixes signature.

JERE O. HUXFORD.